United States Patent
Su

(10) Patent No.: US 9,232,555 B2
(45) Date of Patent: Jan. 5, 2016

(54) USER EQUIPMENT WITH IMPROVED DRX PERFORMANCE

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 14/250,816

(22) Filed: Apr. 11, 2014

(65) Prior Publication Data

US 2015/0257198 A1 Sep. 10, 2015

Related U.S. Application Data

(60) Provisional application No. 61/948,326, filed on Mar. 5, 2014.

(51) Int. Cl.
*H04W 24/08* (2009.01)
*H04W 76/04* (2009.01)
*H04W 52/02* (2009.01)

(52) U.S. Cl.
CPC ........ *H04W 76/048* (2013.01); *H04W 52/0232* (2013.01)

(58) Field of Classification Search
USPC ........ 455/535.1, 435.2, 435.3, 436, 500, 501, 455/515, 67.11; 370/252, 310, 311
See application file for complete search history.

(56) References Cited

U.S. PATENT DOCUMENTS

| | | | |
|---|---|---|---|
| 8,644,875 B2 | 2/2014 | Kiukkonen et al. | |
| 9,026,112 B2* | 5/2015 | Klingenbrunn | H04W 48/16 455/435.2 |
| 2012/0108241 A1* | 5/2012 | Wu | H04W 24/10 455/436 |
| 2012/0207040 A1 | 8/2012 | Comsa et al. | |
| 2013/0201892 A1 | 8/2013 | Holma et al. | |
| 2013/0258883 A1* | 10/2013 | Vargas Bautista | H04W 36/0094 370/252 |
| 2015/0117238 A1* | 4/2015 | Kronestedt | H04W 24/10 370/252 |
| 2015/0223085 A1* | 8/2015 | Siomina | H04W 52/0206 370/252 |

* cited by examiner

*Primary Examiner* — Thanh Le
(74) *Attorney, Agent, or Firm* — Meyertons Hood Kivlin Kowert & Goetzel, P.C.; Jeffrey C. Hood; Joel L. Stevens

(57) ABSTRACT

Operating a UE device having a single radio configured to communicate using a first and second RAT. The UE may begin operating in a connected discontinuous reception (CDRX) mode of the first RAT, where the CDRX mode comprises an on duration timer and an inactivity timer. The method may determine that the single radio of the UE is being used for a second RAT during the CDRX mode. The UE may operate at least one of a CDRX on duration timer or an inactivity timer of the first RAT while the single radio of the UE is being used for the second RAT. While the single radio of the UE is being used for the second RAT, the at least one of the CDRX on duration timer or the inactivity timer may operate even though no communication or monitoring is performed on the first RAT.

20 Claims, 10 Drawing Sheets

USER EQUIPMENT WITH IMPROVED DRX PERFORMANCE

PRIORITY INFORMATION

The present application claims benefit of priority of U.S. Provisional Application Ser. No. 61/948,326, titled "User Equipment with Improved DRX Performance", whose inventor is Li Su, which was filed on Mar. 5, 2014, and which is hereby incorporated by reference in its entirety as though fully and completely set forth herein.

FIELD OF THE INVENTION

The present application relates to wireless devices, and more particularly to a system and method for providing improved performance and/or reduced power consumption in wireless devices that support multiple radio access technologies (RATs).

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1X" (Code Division Multiple Access 2000 (CDMA2000) 1X) RAT that supports voice calls, among other possibilities.

Some UE devices use a single radio to support operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

For example, in such systems the UE may periodically tune from the first network, using a more advanced RAT, to the second network, using a legacy RAT, e.g., to listen to a paging channel for a voice call. However, such tune-away operations from a more advanced RAT, such as LTE, to a legacy RAT, such as GSM, can result in increased power consumption and/or performance degradation of the LTE network.

Therefore, it would be desirable to provide improved performance and power consumption in wireless communication systems where a UE devices use a single radio to support operation on multiple cellular RATs.

SUMMARY OF THE INVENTION

Embodiments described herein relate to a User Equipment (UE) device and associated method for operating the UE device. The UE may include a single radio configured to communicate using a first and second RAT. The UE may begin operating in a connected discontinuous reception (CDRX) mode of the first RAT, where the CDRX mode comprises an on duration timer and an inactivity timer. The method may determine that the single radio of the UE is being used for a second RAT during the CDRX mode. The UE may operate at least one of a CDRX on duration timer or an inactivity timer of the first RAT while the single radio of the UE is being used for the second RAT. While the single radio of the UE is being used for the second RAT, the at least one of the CDRX on duration timer or the inactivity timer may operate even though no communication or monitoring is performed on the first RAT.

Embodiments described herein relate to a User Equipment (UE) device and associated method for operating the UE. The UE may include a radio configured to communicate using a first radio access technology (RAT) and a second RAT. The UE may determine, prior to a sleep time associated with the first RAT, if a scheduled next page decoding of the first RAT conflicts with a page decoding of the second RAT at a first time. Additionally, the UE may perform page decoding of the second RAT at the first time. If the next page decoding of the first RAT conflicts with the page decoding of the second RAT, the next page decoding of the first RAT may not be performed at the first time. Additionally, the UE may perform page decoding of the first RAT at a later time after the first time.

Embodiments described herein relate to a User Equipment (UE) device and associated method for operating the UE. The UE may include a radio configured to communicate using a first radio access technology (RAT) and a second RAT. The UE may determine if the single radio should be reinitialized for the second RAT at a first time based on the single radio being used by the first RAT prior to the first time. If the single radio should be reinitialized for the second RAT, the UE may reinitialize the single radio prior to the first time. The UE may perform communication using the second RAT at the first time.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
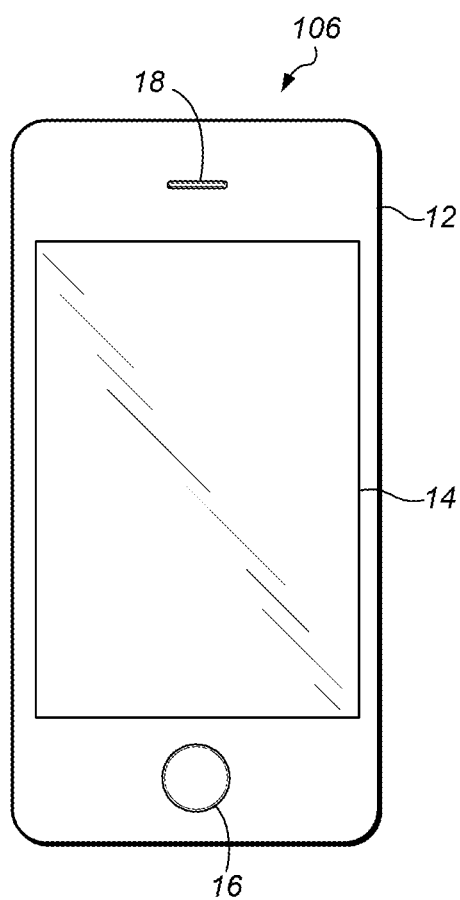
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1XRTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

In the embodiment described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1x. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support LTE and GSM radio access technologies.

Figure 2:
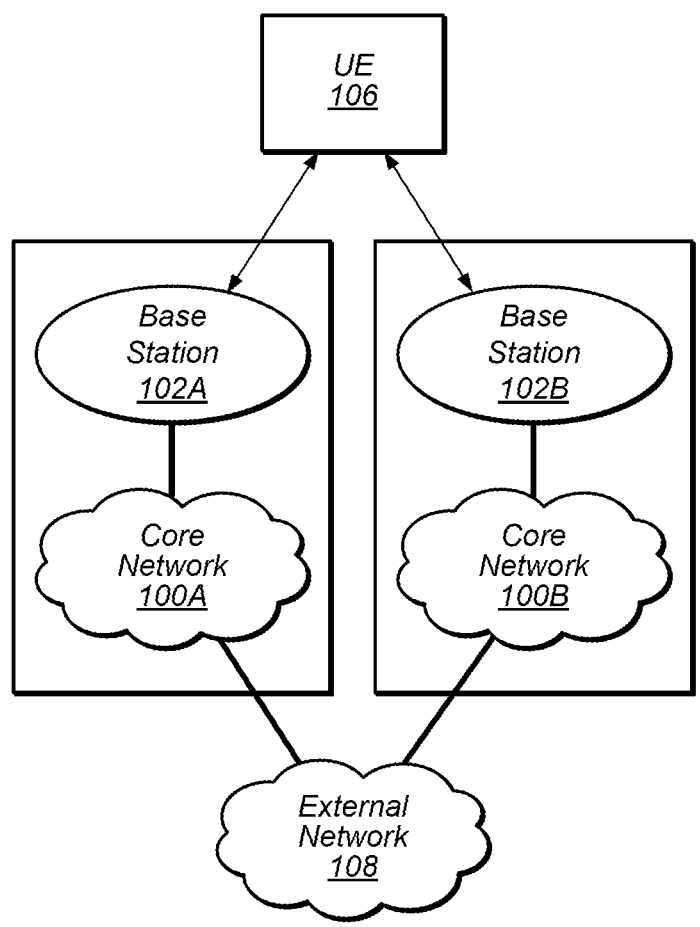
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1xRTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1xRTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
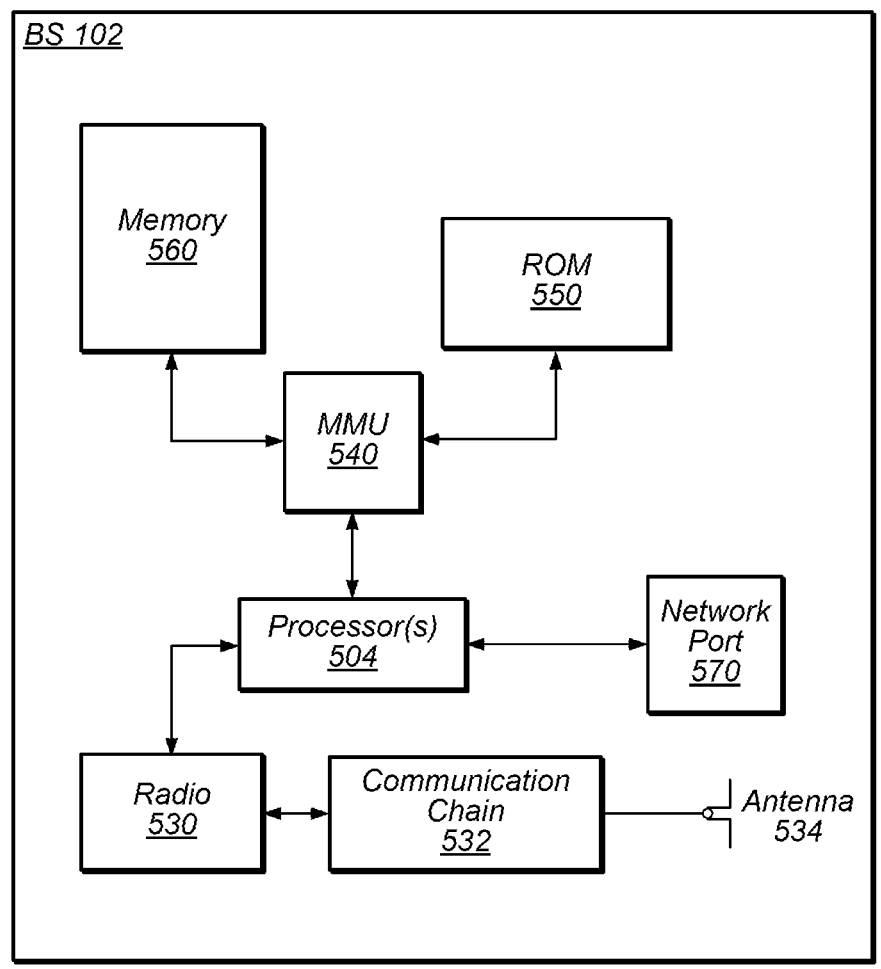
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
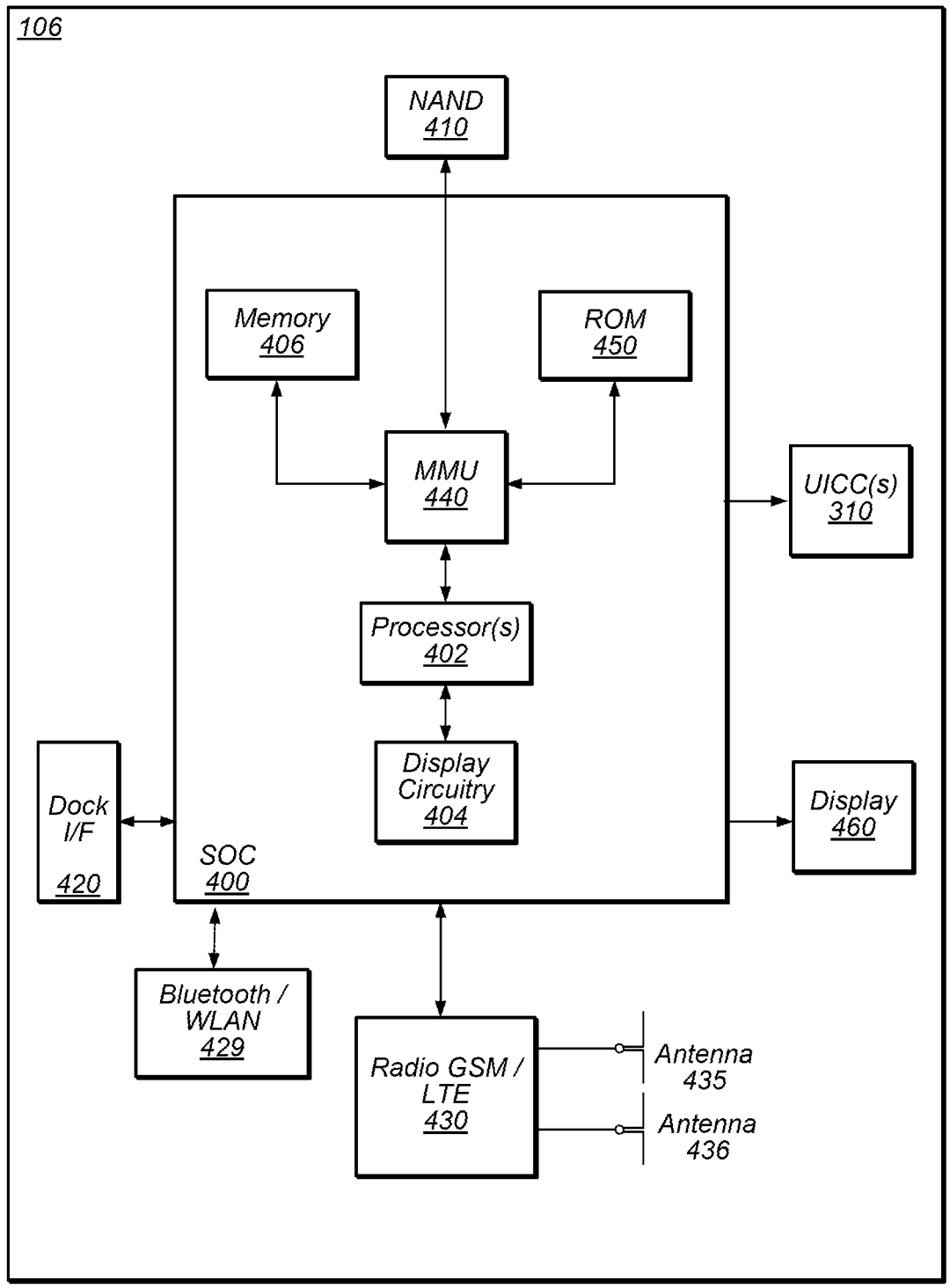
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Buletooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
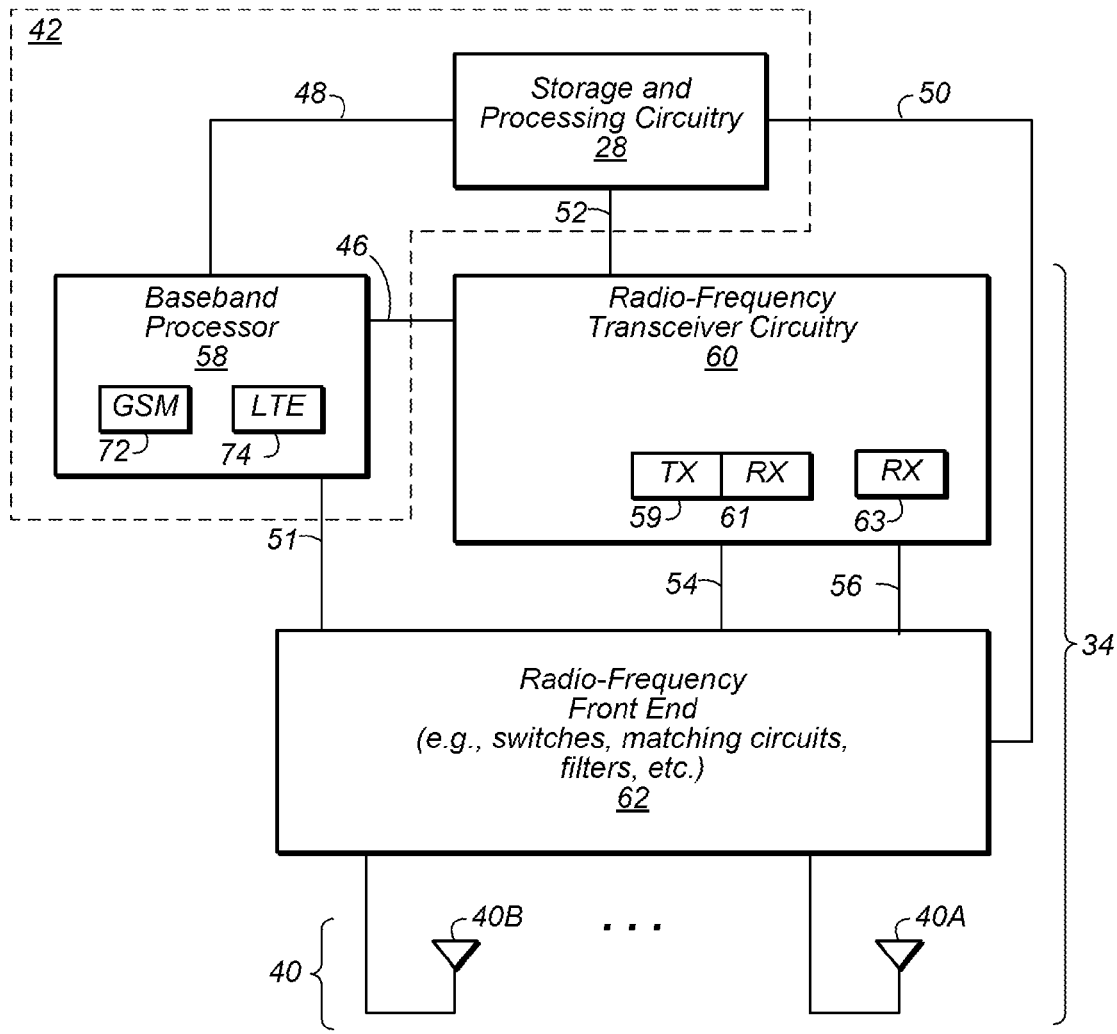
FIGS. 5A and 5B are example block diagrams of wireless communication circuitry in the UE, according to one embodiment.
Figure 5B:
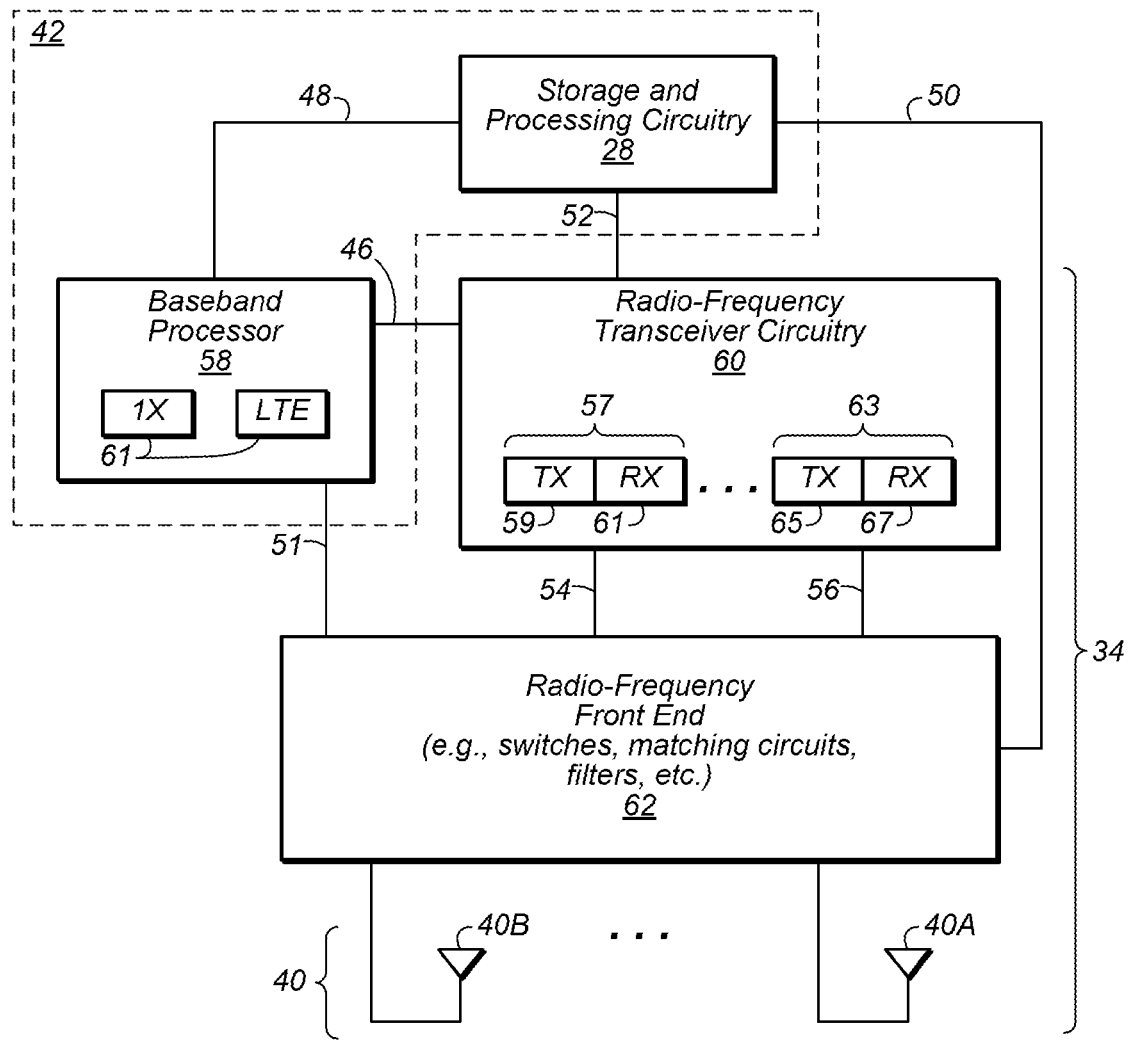

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72 and an LTE protocol stack 74. Thus, protocol stack 72 may be associated with a first radio access technology such as GSM (as an example), and protocol stack 74 may be associated with a second radio access technology such as LTE (as an example). During operation, UE 106 may use GSM protocol stack 72 to handle GSM functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support both LTE and GSM traffic.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM and LTE protocol stacks 72 and 74 may support idle mode operations. Also, one or both of the protocol stacks 72 and 74 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

CDRX in a First RAT while Communicating Using a Second RAT

As discussed above, a UE may use a single radio (e.g., having a single transmit chain and a single receive chain or two receive chains) to communicate using two different RATs. For example, the UE may use a single radio to communicate using a first RAT and may periodically tune away in order to perform various actions for a second RAT, such as page decoding, measurement, synchronization, etc. Note that the radio may be the single cellular radio for the UE or may be one of a plurality of cellular radios. In a multiple radio embodiment, and one of the cellular radios may be used for time-sharing of the first RAT and the second RAT. Additionally, the UE may implement dual SIM dual active (DSDA) and/or dual SIM dual standby (DSDS), as desired.

In one embodiment, the first RAT may be LTE and the second RAT may be GSM, although other combinations of RATs are envisioned. In some cases, it may be typical to tune away periodically in order to perform synchronization for the second RAT (e.g., for neighboring base stations of the current base station of the second RAT). In the following, the first RAT may be described as LTE and the second RAT may be described as GSM, but any of these descriptions may apply to other RATs, as desired.

In comparison to CDMA 2000 1x, SRLTE for GSM may have significant differences. For example, GSM tune-away (e.g., for page decoding) may be 10 times more frequent (e.g., at least once per 470 ms) than 1x tune-way which is once per 5.21 s. Additionally, in most cases, the duration of each GSM tune-away may be very short, e.g., 10-20 ms, while in most cases duration of 1x tune-away may be 90-100 milliseconds.

Operation of connected discontinuous reception (CDRX) in the first RAT may allow the UE to periodically sleep without requiring continuously decoding of PDCCH. In some embodiments, e.g., in LTE connected mode, timer-based parameters may be received by the UE in an RRC reconfiguration message. These parameters may include:

DRX cycle: duration of one cycle of UE on/off Time (e.g. 320 ms for long DRX);

On duration Timer: duration of time UE monitors PDCCH during DRX cycle (e.g. 10 ms); and/or DRX inactivity timer: after receiving a scheduling message, the UE may continuously monitor PDCCH while timer runs. If no targeted PDCCH is received when timer expires, the UE may go to sleep (e.g. 100 ms).

In one embodiment, for 1x-SRLTE implementation, when 1x tune-away happens, CDRX parameters may be reset when tune-back to LTE occurs. For example, in LTE, the UE may stay in active until CDRX is started from next closest CDRX subframe offset for this UE. Because the 1x page cycle is 5.12 s long, and LTE typical CDRX cycle is 320 ms, the power consumed due to the extra LTE active time until next CDRX sleep is not obviously detectable. However, for GSM tune-away, due to its high frequency (e.g., 10-20 ms tune-away in every 470 ms), there may be a high possibility that GSM tune-way collides with the LTE active period (e.g., On duration+inactivity timer periods) in a CDRX cycle (typical 320 ms). The previously discussed 1x-SRLTE embodiment would result in the UE staying awake most of time instead of DRX. For example, lab testing results indicated 80% higher power consumption for SRLTE (single radio LTE) in LTE CDRX mode than normal LTE CDRX mode for GSM.

Accordingly, the GSM tune-way time may be incorporated into CDRX On duration or be included within the inactivity timer.

For example, during LTE wakeup on the subframe when CDRX On duration is started, if radio frequency circuitry (e.g., the single radio) is being used by GSM, CDRX On duration timer may be started as usual, even though PDCCH for LTE may not be monitored due to radio frequency circuitry being used for GSM. Additionally, in this case, after ON duration timer expires, inactivity timer may be started as usual.

Additionally, when GSM completes tune-away, if either CDRX ON timer or inactivity timer is still running, the radio frequency circuitry may be tuned back to LTE and the PDCCH may be monitored until inactivity timer expires. At this point, the UE may then go to sleep.

In another case, when GSM completes tune-away, if CDRX inactivity timer has expired, the UE may continue to sleep (e.g., the LTE stack should continue sleep) until the next CDRX wakeup.

If GSM tune-away happens while LTE is in active (e.g., On duration or inactivity timer is running), the On timer and inactivity timer may be kept running until they expire as usual. If, when the inactivity timer expires, RF is still tuned away for GSM, the UE may go to sleep (e.g., the LTE stack may go to sleep) and schedule wakeup on next CDRX On time as usual.

In one embodiment, no matter how long GSM tune-away takes, LTE CDRX handling may consider the GSM tune-away time as part of PDCCH monitoring time under On duration and inactivity timer. Accordingly, in some cases, LTE may enter/exit multiple CDRX cycles until RF is tuned back from GSM.

By implementing various embodiments discussed above, LTE may still perform normal CDRX sleep and wakeup even though there may be frequent collision with GSM tune-away. As a result, SRLTE power consumption in LTE CDRX mode may be on pair with LTE only CDRX mode. Additionally, there may be throughput gains for LTE.

Figure 6:
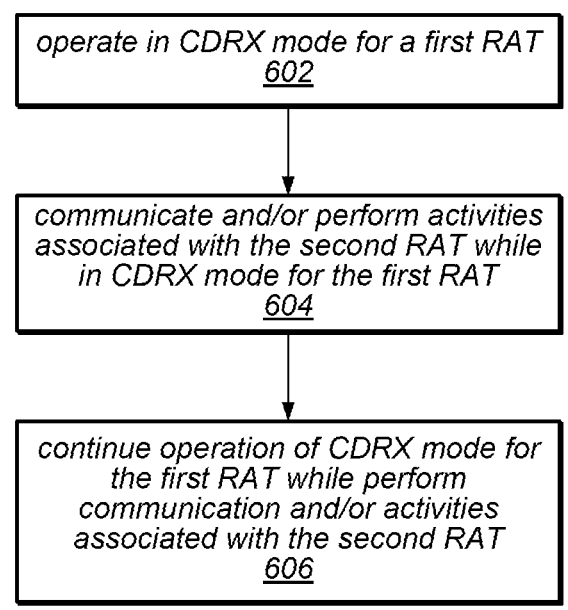
FIG. 6 is a flowchart diagram illustrating an exemplary method for performing CDRX in a first RAT while communicating using a second RAT.

FIG. 6—CDRX in a First RAT while Communicating Using a Second RAT

FIG. 6 is a flowchart diagram illustrating a method for performing CDRX in a first RAT while communicating using a second RAT. The method may be performed by a UE device (such as UE 106) that uses a first radio for both a first RAT and a second RAT (e.g., LTE and GSM, although other combinations of RATs are envisioned). The method shown in FIG. 6 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

As shown, in 602, the UE may begin operating in CDRX mode of the first RAT. As discussed above, the CDRX mode may include an "on duration" timer and an "inactivity" timer, e.g., which repeats during each CDRX cycle. The CDRX cycle may also include a period of time after the on duration timer and the inactivity timer in which the UE may typically sleep, e.g., when no communication or monitoring of the first RAT occurs during the inactivity time. For example, the CDRX cycle may be approximately 320 milliseconds long, the on duration timer may be approximately 10 milliseconds long, the inactivity timer may be approximately 100-200 milliseconds long, and the remaining time may be determined by subtracting the other values from the total cycle time of CDRX.

In 604, the UE may communicate and/or perform one or more activities associated with the second RAT using the first radio, while the UE is in the CDRX mode of the first RAT. For example, the UE may use the first radio to perform page decoding, measurement, synchronization, etc. associated with the second RAT. The communication in 604 may occur during the on duration timer and/or the inactivity timer of the CDRX mode.

In 606, the UE may continue operation of the CDRX mode in the first RAT even though the first radio is being used to communicate using the second RAT. For example, the on duration timer and/or the inactivity timer may continue to run even though no communication is occurring (e.g., for the on duration timer) and/or no monitoring is occurring (e.g., for the inactivity timer) on the first RAT. This operation may be instead of, for example, altering one or more of the timers because the radio is being used for the second RAT.

For example, at the beginning of a CDRX cycle, the UE may typically perform communication using the first RAT during the on duration timer. However, it may be possible that the UE is already using the first radio to communicate using the second RAT at this time. Accordingly, the CDRX on duration timer may be initiated anyway, even though the UE is using the first radio to communicate with the second RAT instead of performing communication using the radio for the first RAT. If the radio continues to be used for the second RAT through the on duration timer, the inactivity timer may also be started, even though the first radio is still being used for the second RAT. This may even extend through multiple CDRX cycles, e.g., multiple on duration and inactivity timers of the CDRX cycles associated with the first RAT.

When the second RAT completes its processes, the UE may use the first radio to perform actions associated with the first RAT, such as communication with the first RAT if still in the on duration timer or monitoring (e.g., PDCCH monitoring) of the first RAT if still in the inactivity timer. In one embodiment, the UE may simply monitor the first RAT upon completion of the second RAT processes, even if the on duration timer is still active. However, monitoring may not be performed if both the on duration and the inactivity timers have expired. Upon completion of the inactivity timer, the UE may enter a sleep mode (e.g., associated with the first RAT, the first radio, and/or other devices of the UE). When the second RAT completes its processes and the inactivity timer has expired, the UE may enter sleep mode (e.g., for the first RAT, e.g., the stack associated with the first RAT may enter sleep mode) until the next CDRX cycle begins.

Similarly, if the UE tunes away from the first RAT to the second RAT during the on duration or inactivity timer (e.g., while the first RAT is using the first radio), the timers may continue to operate normally, even though the first radio is being used for activities associated with the second RAT. If the inactivity timer has expired, the UE may enter sleep mode for the first RAT until the next CDRX cycle begins.

In one embodiment, no matter how long the second RAT activities take, the first RAT may operate the timers as usual. In effect, the activities of the second RAT may not affect the timers of the first RAT, even though communication and/or monitoring of the first RAT may not be occurring due to the use of the first radio for the second RAT. For example, multiple CDRX cycles may occur while the radio is used to perform the second RAT activities.

Avoiding DRX Collisions for a First and Second RAT

As discussed above, a UE may use a single radio (e.g., having a single transmit chain and a single receive chain or two receive chains) to communicate using two different RATs. For example, the UE may use a single radio to communicate using a first RAT and may periodically tune away, e.g., at each DRX cycle of the second RAT) in order to perform various actions for a second RAT, such as page decoding, measurement, synchronization, etc. Note that the radio may be the single cellular radio for the UE or may be one of a plurality of cellular radios. In a multiple radio embodiment, and one of the cellular radios may be used for time-sharing of the first RAT and the second RAT. In one embodiment, the first RAT may be LTE and the second RAT may be GSM, although other combinations of RATs are envisioned. Additionally, the UE may implement dual SIM dual active (DSDA) and/or dual SIM dual standby (DSDS), as desired.

In the following, the first RAT may be described as LTE and the second RAT may be described as GSM, but any of these descriptions may apply to other combinations of RATs, as desired. The LTE DRX cycle may be approximately 1.28 seconds. Additionally, the GSM DRX cycle may occur every 470 milliseconds. As a result, the two cycles may conflict often. For example, when both cycles have an overlapping beginning, there may be a conflict for performing communication for LTE and for GSM (e.g., for page decoding).

One method of handling the situation where an LTE DRX cycle occurs when the radio is being used for GSM or may occur soon (e.g., within 10 milliseconds), is to determine that the radio is in use or will be in use for GSM soon and simply skip the LTE DRX current cycle. However, this approach results in extra power consumption. For example, even though circuitry associated with the LTE communication may not be powered on, power may need to be provided to other hardware to make the determination to skip the current LTE cycle.

For example, POWER IC may have powered on and/or the processor which runs the LTE software may be powered on. As a result, when the current LTE DRX cycle is skipped due to detecting collision with GSM DRX cycle and returns to sleep (e.g., for LTE), the CPU which runs the LTE software may return to idle, which may trigger POWER IC to go back sleep with some time delay (e.g., around 10 ms).

Although this extra power may not be a significant concern for LTE and 1x SRLTE embodiments, the extra power consumption for LTE and GSM SRLTE embodiments may be more noticeable, e.g., resulting in 5-6% extra power consumption. More specifically, GSM idle mode power consumption in SRLTE may be 8% higher than GSM only idle mode power consumption, e.g., because GSM in SRLTE mode may take an extra two GSM frames to initialize the radio frequency circuitry at wakeup time, compared with GSM only idle mode, since GSM in SRLTE may assume the radio frequency circuitry has been used by LTE, so has to reinitialize the radio frequency circuitry in GSM mode.

Accordingly, the following embodiments may address various power consumption issues.

For example, prior to entering sleep in a current LTE cycle, the LTE stack may query the GSM stack about next to-be scheduled wakeup time and estimated wakeup duration. Using this information, the next LTE wakeup time (e.g., of the LTE DRX cycle) and GSM wakeup time (e.g., of the GSM DRX cycle) may be compared. If a collision is estimated to happen, the next LTE wakeup may be skipped, and wakeup may be scheduled on the second next LTE DRX cycle (e.g., the second next page occasion) instead of next LTE DRX cycle or next page occasion.

As another example, if LTE enters sleep, and subsequently if GSM enters sleep, then GSM stack may inform the LTE stack its next wakeup time and estimated wakeup duration. The LTE stack may then compare the GSM's next wakeup time with its own wakeup time, and if collision is estimated to be happened, the LTE stack may change its wakeup time to the second next page occasion instead of next page occasion.

Further, in one embodiment, prior to the LTE stack entering sleep, the LTE stack may also inform the GSM stack that the radio frequency chain (e.g., the circuitry of the radio) is released by the LTE stack. As a result, the GSM stack can determine if it needs to wakeup ahead of its next cycle (e.g., by two additional GSM frames) in order to initialize the radio frequency chain first. Since in a typical case, GSM wakes up 2.7 times more frequently than LTE (e.g., where LTE DRX cycle is 1.28 s and GSM DRX cycle is 470 ms), GSM may only need to wakeup earlier once per every LTE DRX cycle, instead of every GSM DRX cycle.

As a result of one or more of the above-described procedures, there may be a significant power consumption reduction.

Figure 7:
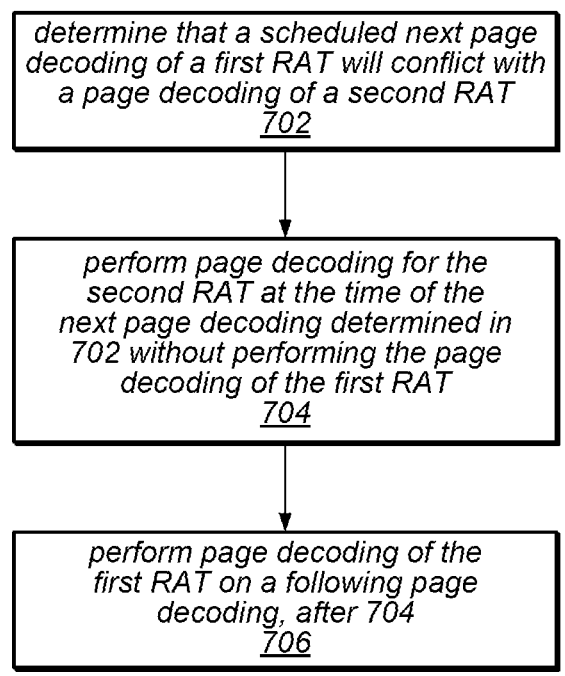
FIG. 7 is a flowchart diagram illustrating an exemplary method for avoiding DRX collision for a first and second RAT.

FIG. 7—Avoiding DRX Collisions for a First and Second RAT

FIG. 7 is a flowchart diagram illustrating a method for avoiding DRX collision for a first and second RAT. The method of FIG. 7 may be performed by a UE device (such as UE 106) that uses a first radio for both the first RAT and the second RAT (e.g., LTE and GSM, although other combinations of RATs are envisioned). The method shown in FIG. 7 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 702, a UE may determine that a scheduled next page decoding (e.g., within a DRX cycle) of a first RAT will conflict with a page decoding of a second RAT. The determination of 702 may occur in a current DRX cycle, e.g., during or near a current page decoding, but prior to a sleep period associated with the first RAT. Upon determining that there is a conflict of page decodings (or more generally, DRX cycles of the first RAT and second RAT), the UE may skip the next page decoding of the first RAT in order to avoid the conflict. Alternatively, the UE may skip the next page decoding of the second RAT, as desired.

In 704, the UE may perform page decoding for the second RAT at the time of the next page decoding determined in 702. Additionally, where there is a conflict between the first RAT and the second RAT page decodings, the UE may not perform the page decoding for the first RAT. However, where there is not a page decoding conflict, the UE may also perform page decoding for the first RAT.

In 706, the UE may perform page decoding for the first RAT on the following page decoding, when there is a detected page decoding conflict from 702.

While FIG. 7 is described with regard to next page decodings, it may generally apply to DRX cycles. For example 702 may determine that a scheduled next DRX cycle of the first RAT will conflict with a DRX cycle of the second RAT. Similarly 704, may perform operations associated with the DRX cycle of the second RAT at the time of that DRX cycle determined in 702. Finally, the in 706, the UE may perform operations associated with the DRX of the first RAT after the time of 704.

Figure 8:
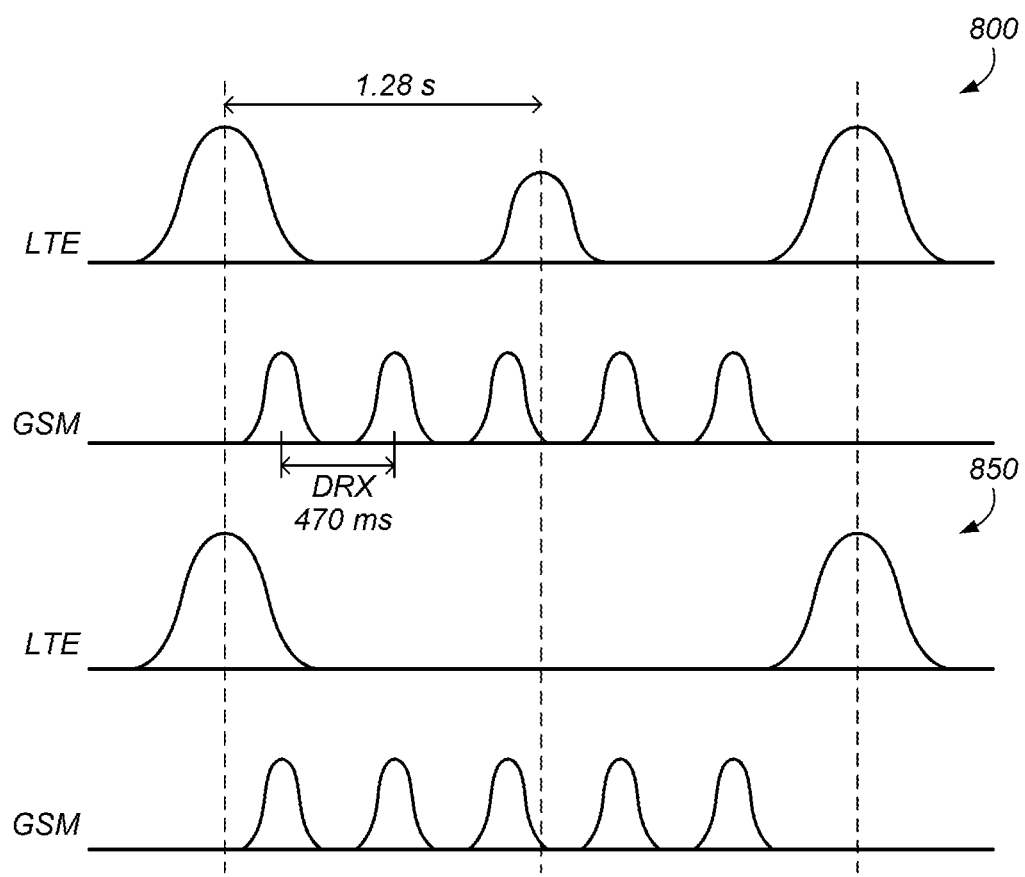
FIG. 8 is an exemplary timing diagram corresponding to one embodiment of FIG. 7.

FIG. 8 Exemplary Timing Diagram

FIG. 8 is an exemplary timing diagram that corresponds to one embodiment of the method of FIG. 7. In particular, a first case without prediction is shown by 800 and a second case with prediction (e.g., according to the method of FIG. 7) is shown by 850. In the shown example, the first RAT is LTE and the second RAT is GSM, although other RATs are envisioned.

In 800, a page decoding for LTE may be performed in a first DRX cycle. At the second page decoding for LTE, the UE may determine that there is a conflict between LTE and GSM (e.g., their DRX cycles), and accordingly may return LTE to sleep. However, because various circuits and/or processors had to be powered on to make that determination, in 800, there is still a significant consumption of power at this second DRX cycle, even though the page decoding for LTE did not occur. Finally, in the third page DRX cycle, page decoding for LTE is performed as normal.

In contrast, in 850, the same situation is shown except with prediction of future conflicts. As shown in this case, there is no power consumption associated with the second DRX cycle for LTE since the conflict was predicted prior to its occurrence. As a result, there is no need to power up various hardware associated with the first RAT during the second DRX cycle.

Figure 9:
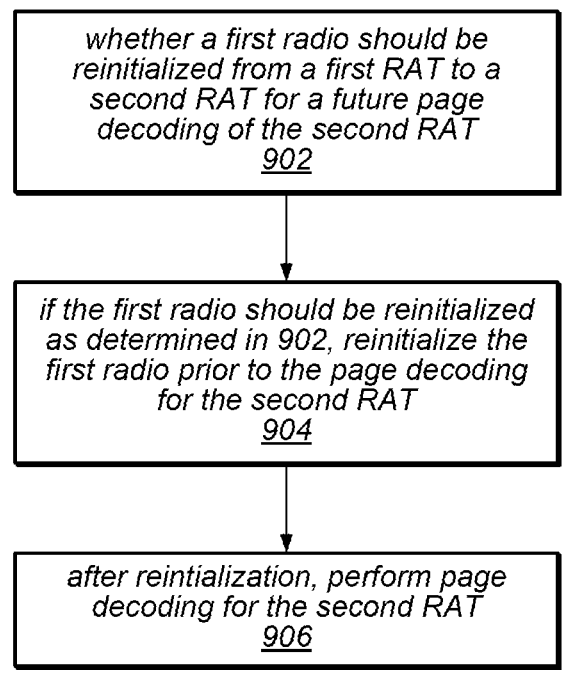
FIG. 9 is a flowchart diagram illustrating an exemplary method for reducing power consumption based on DRX prediction.

FIG. 9—Reducing Power Consumption based on DRX Prediction

FIG. 9 is a flowchart diagram illustrating a method for reducing power consumption based on DRX prediction for a first and second RAT. The method of FIG. 9 may be performed by a UE device (such as UE 106) that uses a first radio for both the first RAT and the second RAT (e.g., LTE and GSM, although other combinations of RATs are envisioned). The method shown in FIG. 9 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 902, a UE may determine whether the first radio should be reinitialized from a configuration associated with the first RAT (e.g., to perform communication or monitoring using the first RAT) to a configuration associated with the second RAT (e.g., to perform communication or monitoring using the second RAT) for a future page decoding of the second RAT. For example, the UE may operate according to a DRX cycle for the second RAT that is more frequent than the DRX cycle for the first RAT. As a result, the first radio (e.g., the transmit and/or receive chains of the first radio) may not need to be reinitialized for the second RAT since the first radio was previously used for the second RAT instead of the first RAT. As an example, referring to FIG. 800 of FIG. 8, the first radio may only be reinitialized for DRX cycles in which LTE was just used; however, for cases where the prior use of the radio was for GSM, no reinitialization may be necessary. For example, reinitialization may only be required in 800 for the first and fourth DRX cycles of GSM. As another example, reinitialization may only required in 850 for the first DRX cycle of GSM.

In 904, if the first radio should be reinitialized as determined in 902, the radio may be reinitialized prior to the page decoding of the second RAT. For example, in one embodiment, the radio may be reinitialized, e.g., by one or more frames of the second RAT (e.g., where the RAT is GSM, the radio may be reinitialized two GSM frames prior to the DRX cycle for GSM).

In 906, after reinitialization, the UE may use the first radio to perform communication using the second RAT to perform page decoding for the second RAT.

While FIG. 9 is described with regard to next page decodings, it may generally apply to DRX cycles. For example 902 may determine whether the first radio should be reinitialized from a configuration associated with the first RAT to a configuration associated with the second RAT for a future DRX cycle of the second RAT. Similarly in 904, if the first radio should be reinitialized as determined in 902, it may be done prior to the DRX cycle of the second RAT. Finally, in 906, after reinitialization, the UE may use the first radio to perform operations associated with the DRX cycle of the second RAT (e.g., for page decoding, among other possibilities).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   at a user equipment device (UE) comprising a first radio, wherein the first radio is configurable to operate according to a first radio access technology (RAT) and a second RAT:
      operate in a connected discontinuous reception (CDRX) mode of the first RAT, wherein the CDRX mode comprises an on duration timer and an inactivity timer;
      determine that the first radio of the UE is being used for the second RAT instead of the first RAT during the CDRX mode;
      operate at least one of a CDRX on duration timer or an inactivity timer of the first RAT while the first radio of the UE is being used for the second RAT, wherein, while the first radio of the UE is being used for the second RAT, the at least one of the CDRX on duration timer or the inactivity timer operates even though no communication or monitoring is performed by the first radio on the first RAT.

2. The method of claim 1, wherein said determining comprises determining that the first radio of the UE is being used for tune-away operations on the second RAT.

3. The method of claim 2, wherein the tune-away operations comprise performing page decoding for the second RAT.

4. The method of claim 1, wherein each of the CDRX on duration timer and the inactivity timer of the first RAT operate during tune-away operations of the second RAT.

5. The method of claim 1, wherein multiple cycles of the CDRX mode for the first RAT are performed during tune-away operations of the second RAT, wherein, while the first radio of the UE is being used for the tune-away operations of the second RAT, the multiple cycles of the CDRX mode for the first RAT are performed even though no communication or monitoring is performed by the first radio on the first RAT.

6. The method of claim 1, further comprising:
   starting the inactivity timer associated with the first RAT in response to expiration of the on duration timer, wherein said starting the inactivity timer is performed while the first radio is being used for the second RAT.

7. The method of claim 1, wherein UE comprises a single radio for performing cellular communication and wherein the first radio is the single radio.

8. The method of claim 1, wherein the first RAT comprises long term evolution (LTE).

9. The method of claim 1, wherein the second RAT comprises global system for mobile communications (GSM).

10. The method of claim 1, wherein the UE comprises two smart cards which each implement SIM (Subscriber Identity Module) functionality, wherein the UE implements DSDA (Dual SIM Dual Active) functionality.

11. A user equipment device (UE), comprising:
   a first radio, wherein the first radio is configured to perform communication using a first radio access technology (RAT) and a second RAT and maintain a connection to both the first RAT and the second RAT; and
   one or more processors coupled to the first radio, wherein the one or more processors and the first radio are configured to:
      begin operating according to the first RAT during an on period of a connected discontinuous reception (CDRX) mode of the first RAT;
      determine that the first radio is being used for tune-away operations of a second RAT;
      start a CDRX on duration timer of the first RAT, wherein the CDRX on duration timer is started even though no monitoring is performed on the first RAT;
      start a CDRX inactivity timer in response to expiration of the CDRX on duration timer, wherein each of the CDRX on duration timer and the inactivity timer of the first RAT operate while the first radio is used for the tune-away operations of the second RAT.

12. The UE of claim 11, wherein the tune-away operations comprise performing page decoding for the second RAT.

13. The UE of claim 11, wherein multiple cycles of the CDRX mode for the first RAT are performed during the tune-away operations of the second RAT, wherein a plurality of on duration timers and inactivity timers of the first RAT while the first radio is used for the tune-away operations of the second RAT.

14. The UE of claim 11, wherein UE comprises a single radio for performing cellular communication and wherein the first radio is the single radio.

15. The UE of claim 11, wherein the first RAT comprises long term evolution (LTE), wherein the second RAT comprises global system for mobile communications (GSM).

16. The UE of claim 11, wherein the UE comprises two smart cards which are each configured to implement SIM (Subscriber Identity Module) functionality, wherein the UE is configured to implement DSDA (Dual SIM Dual Active) functionality using the first radio.

17. A non-transitory, computer accessible memory medium storing program instructions for execution by a user equipment device (UE), wherein the UE comprises a first radio for communicating using a first radio access technology (RAT) and a second RAT, wherein the program instructions are executable by a processor to:

begin operating according to the first RAT during an on period of a connected discontinuous reception (CDRX) mode of the first RAT;

determine that the first radio is being used for tune-away operations of a second RAT;

start a CDRX on duration timer of the first RAT, wherein the CDRX on duration timer is started even though no monitoring is performed on the first RAT.

18. The non-transitory, computer accessible memory medium of claim 17, wherein the program instructions are further executable to:

start a CDRX inactivity timer in response to expiration of the CDRX on duration timer, wherein each of the CDRX on duration timer and the inactivity timer of the first RAT operate while the first radio is used for the tune-away operations of the second RAT.

19. The non-transitory, computer accessible memory medium of claim 18, wherein multiple cycles of the CDRX mode for the first RAT are performed during the tune-away operations of the second RAT, wherein a plurality of on duration timers and inactivity timers of the first RAT while the first radio is used for the tune-away operations of the second RAT.

20. The non-transitory, computer accessible memory medium of claim 18, wherein UE comprises a single radio for performing cellular communication and wherein the first radio is the single radio.

* * * * *